US012123573B1

(12) United States Patent
Xu et al.

(10) Patent No.: US 12,123,573 B1
(45) Date of Patent: Oct. 22, 2024

(54) TRANSPARENT COVER, COVER ASSEMBLY AND LUMINOUS DEVICE THEREOF

(71) Applicant: SHENZHEN SNC OPTO ELECTRONIC CO., LTD, Shenzhen (CN)

(72) Inventors: Jianyong Xu, Shenzhen (CN); Zhiping Ma, Shenzhen (CN); Tao Wang, Shenzhen (CN)

(73) Assignee: SHENZHEN SNC OPTO ELECTRONIC CO., LTD, Shenzhen (CN)

( * ) Notice: Subject to any disclaimer, the term of this patent is extended or adjusted under 35 U.S.C. 154(b) by 0 days.

(21) Appl. No.: 18/432,123

(22) Filed: Feb. 5, 2024

(30) Foreign Application Priority Data

Nov. 30, 2023 (CN) ......................... 202323242160.0

(51) Int. Cl.
*F21V 14/06* (2006.01)
*F21V 14/00* (2018.01)
*F21Y 113/00* (2016.01)

(52) U.S. Cl.
CPC .............. *F21V 14/00* (2013.01); *F21V 14/06* (2013.01); *F21Y 2113/00* (2013.01)

(58) Field of Classification Search
CPC ................................ F21V 14/06; F21V 14/065
See application file for complete search history.

(56) References Cited

U.S. PATENT DOCUMENTS

2020/0340644 A1* 10/2020 Lang ....................... F21S 8/086

* cited by examiner

*Primary Examiner* — Sean P Gramling

(57) ABSTRACT

The present disclosure discloses a transparent cover, a cover assembly and a luminous device thereof. The transparent cover includes a body and a plurality of light transparent portions arranged on the body at intervals and arranged above a plurality of light-emitting elements; light emitted by the plurality of light-emitting elements can be transmitted to outside through the plurality of light transparent portions. The body and the plurality of light transparent portions can move along a preset path under preset conditions to change a transmission path that the light emitted by the plurality of light-emitting elements passes through the plurality of light transparent portions. The present disclosure can change the transmission path of the light emitted by the plurality of light-emitting elements.

23 Claims, 9 Drawing Sheets

TRANSPARENT COVER, COVER ASSEMBLY AND LUMINOUS DEVICE THEREOF

CROSS-REFERENCE TO RELATED APPLICATION

This application claims priority to Chinese Patent Application No. 202323242160.0, titled "LENS" and filed to the China National Intellectual Property Administration on Nov. 30, 2023, the entire contents of which are incorporated herein by reference.

TECHNICAL FIELD

The present disclosure relates to the field of lighting technologies, and more particularly, to a transparent cover, a cover assembly and a luminous device thereof.

BACKGROUND

In a related art, a conventional luminous device generally includes a light source and a light source cover.

The conventional luminous device such as an LED light source emits light. The conventional light source cover such as a glass cover, covers on the LED light source to transmit the light emitted by the LED light source to outside.

A relative position between the LED light source and the glass cover is fixed, so that a path that light emitted by the luminous device is basically fixed and unchanged.

SUMMARY

An objective of the present disclosure is to provide a transparent cover, a cover assembly and a luminous device thereof which can change a transmission path of light that light emitted by light-emitting elements thereof.

In a first aspect, a transparent cover according to an embodiment of the present disclosure includes:

a body;

a plurality of light transparent portions arranged on the body at intervals;

the plurality of light transparent portions arranged above the plurality of light-emitting elements, wherein light emitted by the plurality of light-emitting elements can be transmitted to outside through the plurality of light transparent portions; and wherein the body and the plurality of light transparent portions can move along a preset path under preset conditions to change a transmission path that the light emitted by the plurality of light-emitting elements passes through the plurality of light transparent portions.

In a second aspect, a cover assembly according to an embodiment of the present disclosure includes:

a transparent cover as described above; and a driving member configured to drive the transparent cover to move along the preset path.

In a third aspect, a luminous device according to an embodiment of the present disclosure includes:

a transparent cover as described above;

a light-emitting member including a loading member and a plurality of light-emitting elements arranged on the loading member and arranged below the plurality of light transparent portions; and a driving member configured to drive the transparent cover to move along the preset path.

In a fourth aspect, a luminous device according to another embodiment of the present disclosure includes:

a transparent cover including a body and a plurality of light transparent portions arranged on the body;

a light-emitting member including a loading member and a plurality of light-emitting elements arranged on the loading member and arranged below the plurality of light transparent portions, wherein light emitted by the plurality of light-emitting elements can be transmitted to outside through the plurality of light transparent portions; and wherein the light-emitting member and the transparent cover can move relative to each other to change a transmission path that the light emitted by the plurality of light-emitting elements passes through the plurality of light transparent portions.

The present disclosure provides that the body and the plurality of light transparent portions can move along the preset path under preset conditions to change the transmission path that the light emitted by the plurality of light-emitting elements passes through the plurality of light transparent portions. Compared to the related art, a relative fixed position between the conventional light source and the conventional glass cover, the present disclosure can change the transmission path that the light emitted by the plurality of light-emitting elements passes through the plurality of light transparent portions by moving the body and the plurality of light transparent portions, so as to display different light intensities or types of light according to actual requirements.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Apparently, the accompanying drawings in the following description are merely some embodiments of the present disclosure. To one of ordinary skilled in the related art, other accompanying drawings may also be derived from these accompanying drawings without creative efforts.

In order to provide a more complete understanding and beneficial effects of the present disclosure, the following explanation will be made in conjunction with the accompanying drawings, where the same reference numbers in the following description represent the same elements or parts.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. The following description of at least one exemplary embodiment is only for illustrative purposes and shall not be construed as any limitation on the present disclosure or its application or use based on the embodiments of the present disclosure. According to the described exemplary embodiment of the present disclosure, all other embodiments obtained by one of ordinary skilled in the related art on the premise of no creative work are within the protection scope of the present disclosure.

It should be noted that terms of "embodiment" or "example" in the description of the present disclosure indicates that specific features, structures, or characteristics described in conjunction with embodiments or examples should be included in at least one embodiment of the present disclosure. Terms or phrases appearing in various positions in the specification does not necessarily refer to the same embodiment, nor is it an independent or alternative embodiment that is mutually exclusive with other embodiments One of ordinary skilled in the related art can explicitly and implicitly understand that the embodiments described in the present disclosure can be combined with other embodiments.

Referring to FIGS. 1-11, the present disclosure provides a luminous device 10, a cover assembly 100 and a transparent cover 110. For example, the luminous device 10 includes the cover assembly 100 that includes the transparent cover 110. It can be understood that the transparent cover 110 is applied to the cover assembly 100, and the cover assembly 100 is applied to the luminous device 10. It should be noted that the transparent cover 110 is not limited to apply for the cover assembly 100, and can also be applied in other cover components or other luminous devices.

Figure 1:
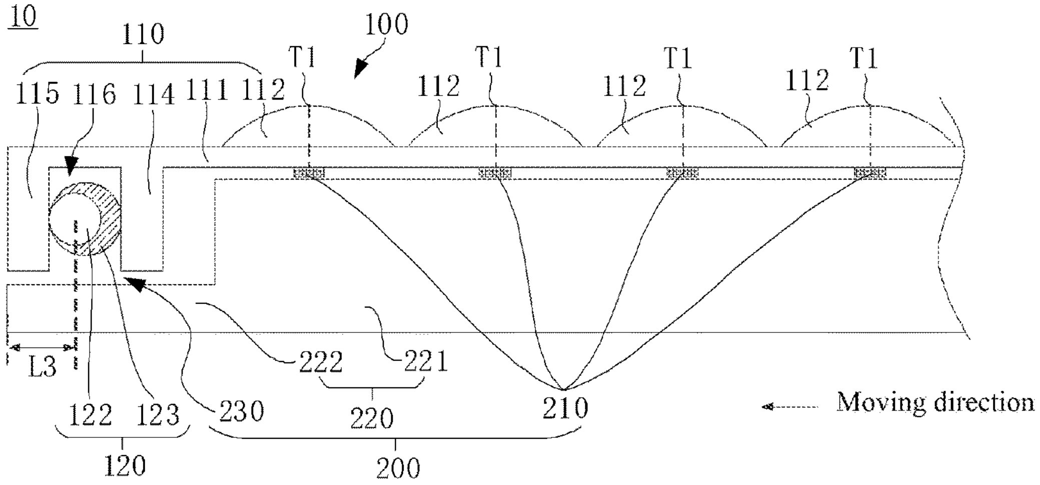
FIG. 1 is a schematic view of a luminous device according to an embodiment provided by the present disclosure, shown the luminous device in a first state.
Figure 2:
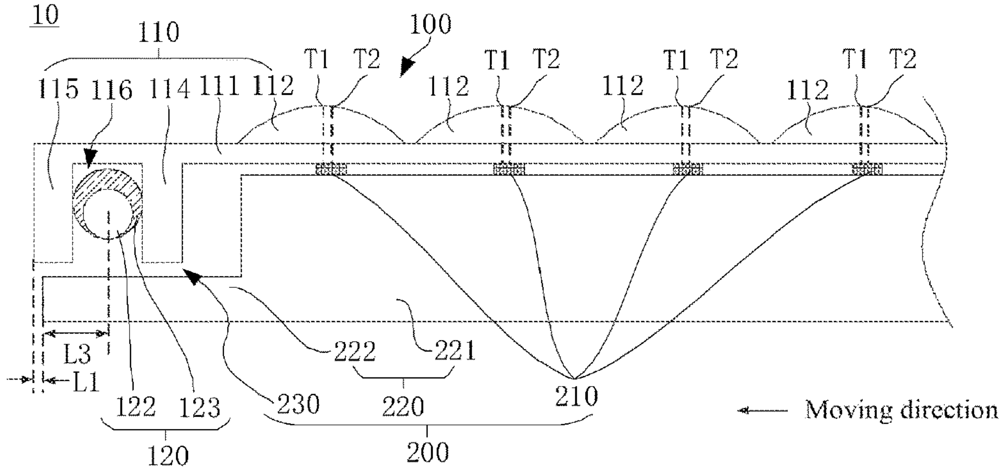
FIG. 2 is similar to FIG. 1, but shown the luminous device in a second state.
Figure 3:
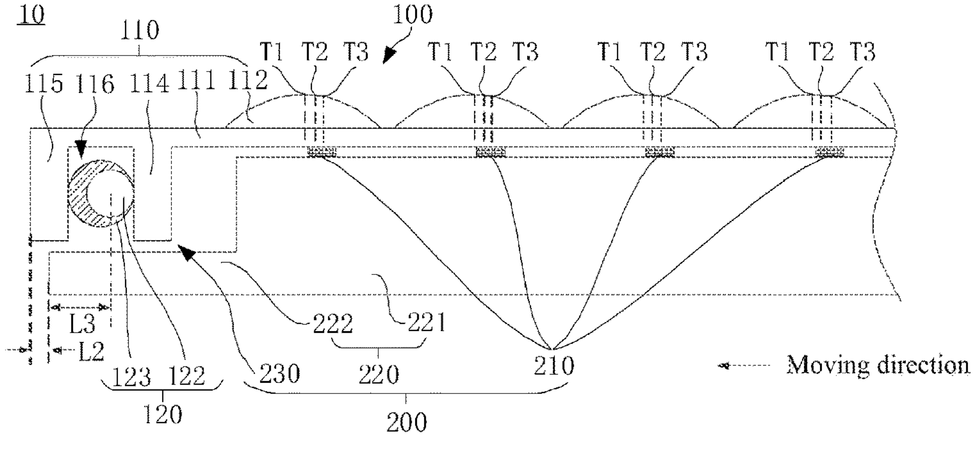
FIG. 3 is similar to FIG. 1, but shown the luminous device in a third state.
Figure 4:
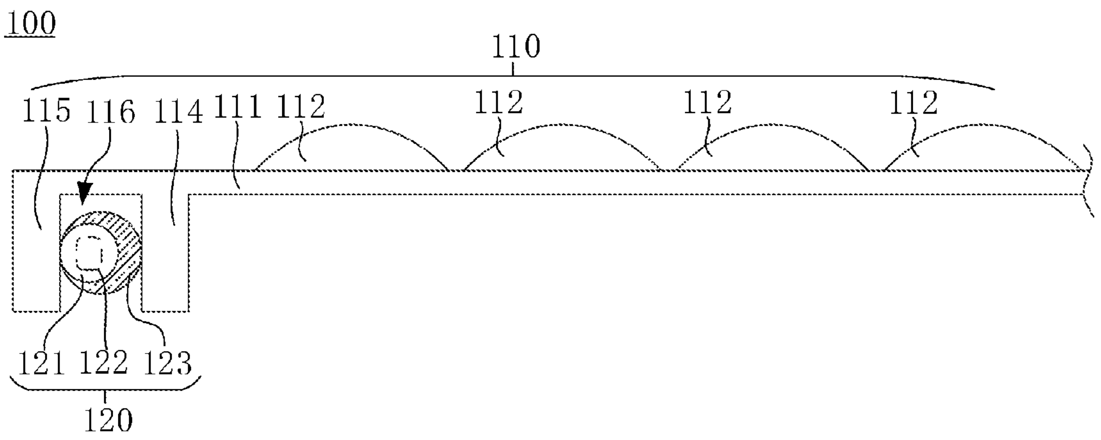
FIG. 4 is a schematic view of a cover assembly of the luminous device of FIG. 1.
Figure 5:
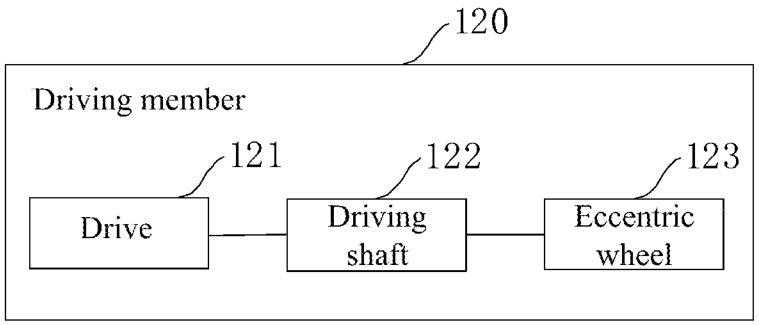
FIG. 5 is a schematic view of a driving member of the luminous device of FIG. 1.
Figure 6:
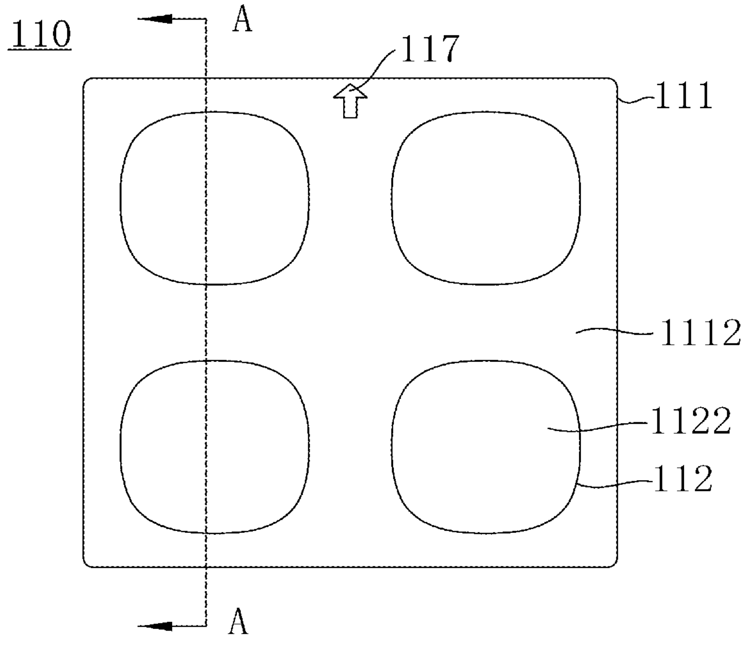
FIG. 6 is a main view of a transparent cover of the luminous device of FIG. 1.
Figure 7:
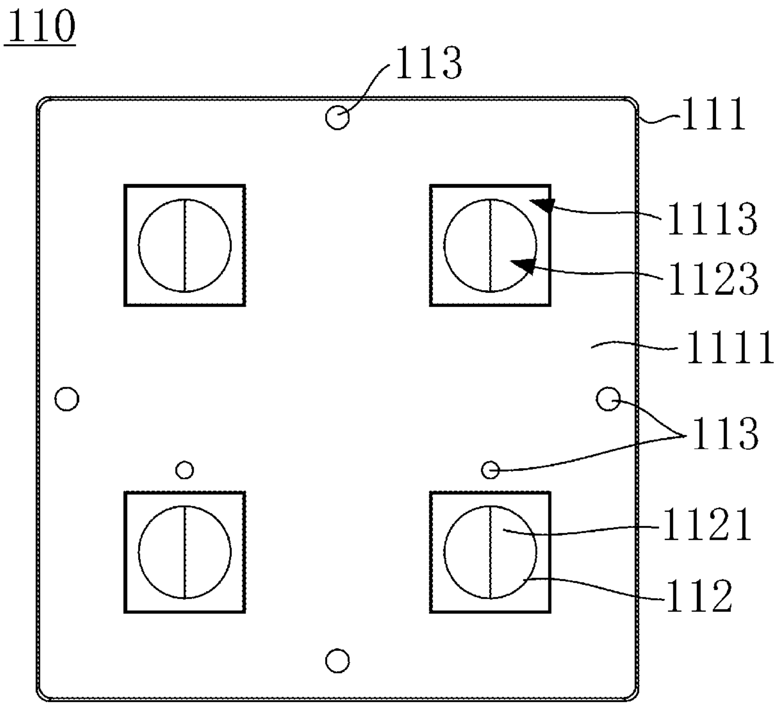
FIG. 7 is a back view of the transparent cover of the luminous device of FIG. 1.
Figure 8:
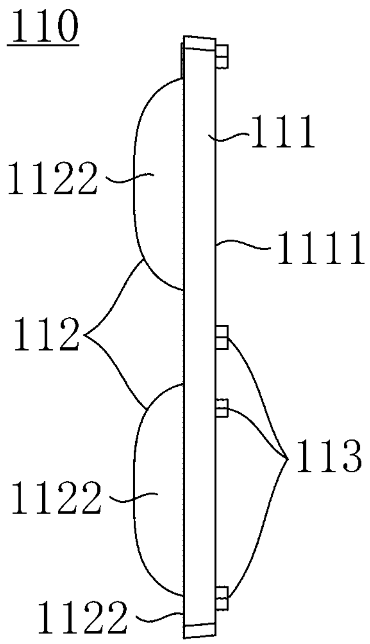
FIG. 8 is a side view of the transparent cover of the luminous device of FIG. 1.
Figure 9:
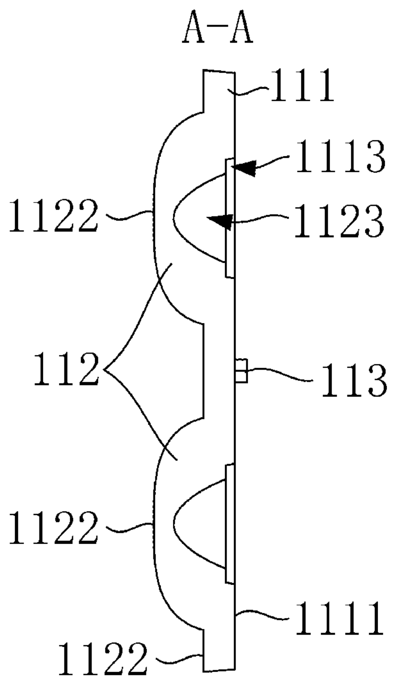
FIG. 9 is a cross-sectional view of the transparent cover along a line A-A of FIG. 6.
Figure 10:
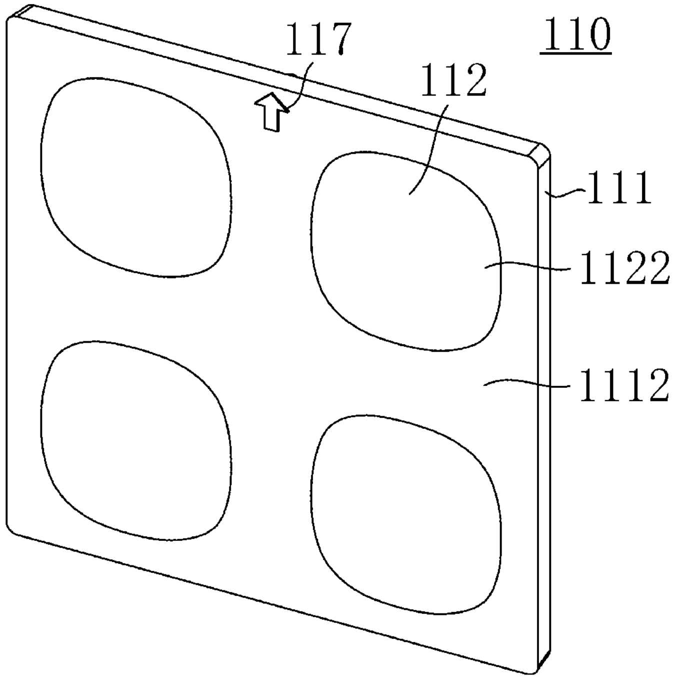
FIG. 10 is a schematic view of a transparent cover according to an embodiment provided by the present disclosure.
Figure 11:
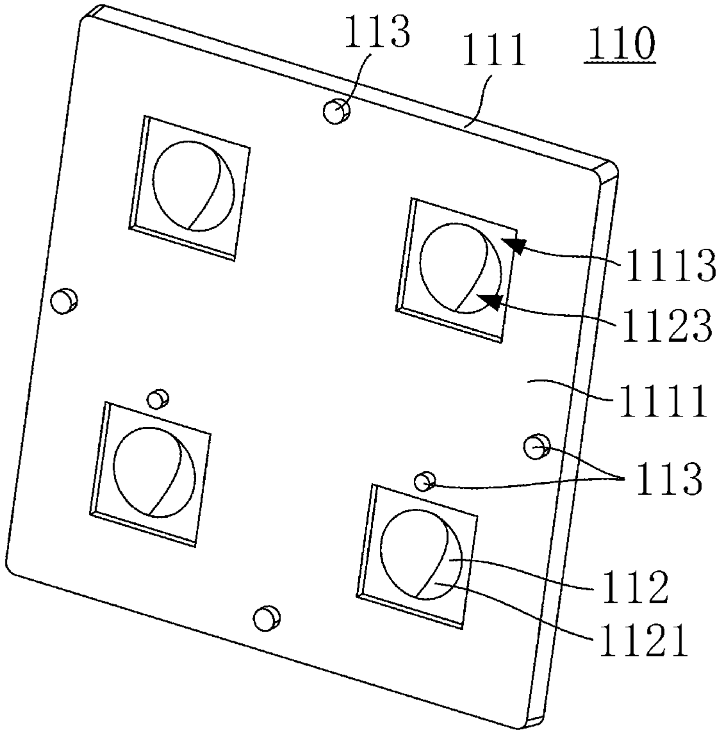
FIG. 11 is similar to FIG. 10, but shown from another view.

Referring to FIG. 1 to FIG. 3, the luminous device 10 according to an embodiment of the present disclosure includes the cover assembly 100 and a light-emitting member 200. It should be noted that components of the luminous device 10 of the present disclosure are not limited to include the cover assembly 100 and the light-emitting member 200. The luminous device 10 can also include other components, such as a housing, and for example, the luminous device 10 can also include a power supply. The present disclosure does not impose any restrictions on the components of the luminous device 10.

The light-emitting member 200 can include a loading member 220 and a plurality of light-emitting elements 210 arranged on the loading member 220 at intervals. For example, the plurality of light-emitting elements 210 is arranged the loading member 220 in a matrix mode.

For example, the plurality of light-emitting elements 210 emits light. The light-emitting element 210 can be understood as a light source, such as a lamp bead, especially the light-emitting element 210 is an LED bead. The light-emitting element 210 is installed on the loading member 220 and electrically connected to circuits of the loading member 220. The loading member 220 can be a circuit board, or a lamp board. The loading member 220 can be electrically connected to a power source such as a battery, which can provide power to the plurality of light-emitting elements 210. The plurality of light-emitting elements 210 can emit light when powered by the battery. It can be understood that the loading member 220 can also be connected to the mains through a connector.

The loading member 220 includes a loading portion 221 and an extending portion 222 fixed to the loading portion 221, for example, the loading portion 221 and the extending portion 222 are integrated with each other. An end of the loading portion 221 extends outwardly to form the extending portion 222, and a thickness of the loading portion 221 is greater than that of the extending portion 222, so that a gap is formed between the loading portion 221 and the extending portion 222, or in other words, a receiving room 230 is formed between loading portion 221 and the extending portion 222, and configured to receive a portion of the cover assembly 100 therein.

The plurality of light-emitting elements 210 is installed on the loading portion 221.

For example, referring to FIG. 1 to FIG. 4, the cover assembly 100 can include the transparent cover 110 and a driving member 120 configured to drive the transparent cover 110 to move along a preset path thereof.

Referring to FIG. 1 to FIG. 5, the driving member 120 can include a drive 121, a driving shaft 122 and an eccentric wheel 123, the drive 121 connected to the driving shaft 122 and the driving shaft 122 connected to the eccentric wheel 123; and wherein the drive 121 is capable of driving the driving shaft 122 to rotate, so that the driving shaft 122 is capable of driving the eccentric wheel 123 to rotate and the eccentric wheel 123 is capable of driving the transparent cover 110 to move.

The drive 121 and the driving shaft 122 are meshed with each other. In other optical embodiments of the present disclosure, the driving shaft 122 can be directly fixed to the drive 121.

The drive 121 can be a driving motor. It should be noted that the present disclosure does not impose any restrictions on the drive 121.

The eccentric wheel 123 is installed n an outer surface of the driving shaft 122. In other optical embodiments of the present disclosure, the eccentric wheel 123 is engaged with the driving shaft 122, the eccentric wheel 123 is integrated with the driving shaft 122, and the eccentric wheel 123 can be understood as an eccentric part that is formed on the outer surface of the driving shaft 122.

It should be noted that the driving member 120 of the present disclosure is not limited to include the drive 121, the driving shaft 122 and the eccentric wheel 123, as long as the driving member 120 can drive the transparent cover 110 to move, the driving member 120 can be other structures which are not limited herein.

The transparent cover 110 is arranged above the plurality of light-emitting elements 210. It can be understood that the plurality of light-emitting elements 210 is arranged below the transparent cover 110, in this way, the light emitted by the plurality of light-emitting elements 210 can be transmitted to outside through the transparent cover 110.

Referring to FIG. 1 to FIG. 4, and FIG. 6 to FIG. 11, the transparent cover 110 can include a body 111 and a plurality of transparent portions 112 arranged on the body 111. For example, the body 111 is integrated with the plurality of transparent portions 112. In other optical embodiments of the present disclosure, the plurality of transparent portions 112 and the body 111 are separated with each other, such has the plurality of transparent portions 112 connected to the body 111, for example, the plurality of transparent portions 112 is connected to the body 111 through an adhesive layer.

As an example, the plurality of transparent portions 112 is arranged on the body 111 at intervals. The plurality of transparent portions 112 is arranged on the body 111 in a matrix mode.

Each of the plurality of transparent portions 112 has a light transmission function, and the plurality of transparent portions 112 is arranged above the plurality of light-emitting elements 210. The light emitted by the plurality of light-emitting elements 210 can be transmitted to outside through the plurality of light transparent portions 112. It can be understood that one of the plurality of transparent portions 112 is arranged above one of the plurality of light-emitting elements 210, and the light emitted by the light-emitting element 210 can be transmitted to outside through the light transparent portion 112.

The body 111 includes a first surface 1111 and a second surface 1112 opposite to the first surface 1111. Any one of the plurality of light transparent portions 112 includes a light incident surface 1121 and a light-emitting surface 1122 opposite to the light incident surface 1121, the light incident surface 1121 and the first surface 1111 formed on the same surface of the transparent cover 110, for example, both the light incident surface 1121 and the first surface 1111 are arranged close to the light-emitting element 210. Both the light-emitting surface 1122 and the second surface 1112 are formed on the other same surface of the transparent cover 110, for example, both the light-emitting surface 1122 and the second surface 1112 are arranged away from the light-emitting element 210.

The light incident surface 1121 is non-protruded out of the first surface 1111. The light incident surface 1121 is concave to the first surface 1111 so that a recess 1123 is formed on any one of the plurality of light transparent portions 112. For example, the light incident surface 1121 is a cambered surface, especially a circular cambered surface.

The transparent cover 110 can at least partially move along a preset path under preset conditions to change a transmission path that the light emitted by the plurality of light-emitting elements 210 passes through the plurality of light transparent portions 112. In an embodiment of the present disclosure, the body 111 and the plurality of light transparent portions 112 can move along the preset path under preset conditions to change the transmission path that the light emitted by the plurality of light-emitting elements 210 passes through the plurality of light transparent portions 112. For example, the driving member 120 drives the body 111 and the plurality of light transparent portions 112 to move along the preset path. For example, the body 111 and the plurality of light transparent portions 112 can be manually driven to move.

The preset conditions can be that the driving member 120, as described above, drives the body 111 and the plurality of light transparent portions 112 to move along the preset path. The preset conditions can also be that the body 111 and the plurality of light transparent portions 112 are manually driven to move along the preset path.

The transmission path of the light of the present disclosure can be understood as a path that the light emitted by the light-emitting element 210 from the light-emitting element 210 to the plurality of light transparent portions 112, and then passing through the plurality of light transparent portions 112.

The plurality of light transparent portions 112 can move to change a thickness that the light emitted by the plurality of light-emitting elements 210 passes through the plurality of light transparent portions 112. For example, a part of any one of the plurality of light transparent portions 112 protrudes from the second surface 1112, an edge of the light-emitting surface 1122 is connected to the second surface 1112, and the light-emitting surface 1122 is a cambered surface, especially a circular cambered surface. It should be noted that the light-emitting surface 1122 is not limited to the cambered surface, but can also be of other shapes, such as a flat surface and a trapezoidal surface, etc.

The plurality of light transparent portions 112 can move to change radians that the light emitted by the plurality of light-emitting elements 210 passes through the plurality of light transparent portions 112. The radians at various positions of the light incident surface 1121 of the transparent portion 112 are different, and/or the radians at various positions of the light-emitting surface 1122 are different.

The plurality of light transparent portions 112 can move to change distances between the plurality of light-emitting elements 210 passes through the plurality of light transparent portions 112. For example, the light incident surface 1121 of any one of the plurality of light transparent portions 112 is a cambered surface, so that when a position of any one of the plurality of light transparent portions 112 changes, distances between different positions of the light incident surface 1121 and the same position of the light-emitting element 210 are different.

When the same light passes through positions of different thicknesses of the light transparent portion 112 to generate different transmission paths. For example, when the same light passes through positions of different radians of the light transparent portion 112 to different transmission paths will be generated, and distances that the same light reaches the plurality of light transparent portions 112 are different to result in different transmission paths.

As an example of the present disclosure, the driving member 12 drives the body 111 and the plurality of light transparent portions 112 to move. The cover assembly 100 further includes a first moving plate 114 and a second moving plate 115, both the first moving plate 114 and the second moving plate 115 arranged on the body 111. For example, the first moving plate 114 and the second moving plate 115 are integrated with each other, that is, the transparent cover 110 further includes the first moving plate 114 and the second moving plate 115. In other optical embodiments of the present disclosure, the first moving plate 114 and the second moving plate 115 are separated from the transparent cover 110, and both the first moving plate 114 and the second moving plate 115 are fixed to the body 111.

The first moving plate 114 and the second moving plate 115 are spaced from each other to form an active space 116 therebetween, the eccentric wheel 123 received in the active space 116, the eccentric wheel 123 can drive the first moving plate 114 and/or the second moving plate 115 within the active space 116 to further drive the transparent cover 110 to move.

A portion of the driving member 120 is received in a receiving room 230, such as the eccentric wheel 123 being received in the receiving room 230. For example, the eccentric wheel 123 is received in the receiving room 230, and the driving shaft 122 is at least partially received in the receiving room 230.

The first moving plate 114 is received in the receiving room 230, and the second moving plate 115 is at least partially received in the receiving room 230.

The preset path can include a preset direction and a preset range. The preset direction can be referenced to a moving direction as shown in FIG. 1 to FIG. 3, which are shown that the driving member 120 is in three different states to drive the transparent cover 110 to move to three different positions. Referring to FIG. 1 to FIG. 3, a distance between a projection that an axis of the driving shaft 122 is projected on the extending portion 222 and an edge of the extending portion 222 is L3, wherein L3 is a constant value. There are no displacement changes when the driving shaft 122 rotates relative to the extending portion 222.

Referring to FIG. 1, when the driving member 120 is in a first state, a distance between the driving shaft 122 and the first moving plate 114 is greater than a distance between the driving shaft 122 and the second moving plate 115. For example, a side of the eccentric wheel 123 away from the axis of the driving shaft 122 is in contact with the first moving plate 114. A side of the eccentric wheel 123 near the axis of the driving shaft 122 is in contact with the second moving plate 115, or the driving shaft 122 is directly in contact with the second moving plate 115. A side of the second moving plate 115 away from the first moving plate 114 is flush with an end surface of the extending portion 222, and the second moving plate 115 is completely installed within the receiving room 230 One of the plurality of light-emitting elements 210 is arranged below one of the plurality of light transparent portions 112, and a specific position of the light-emitting element 210 corresponds to a first position T1 of the light transparent portions 112.

Figure 12:
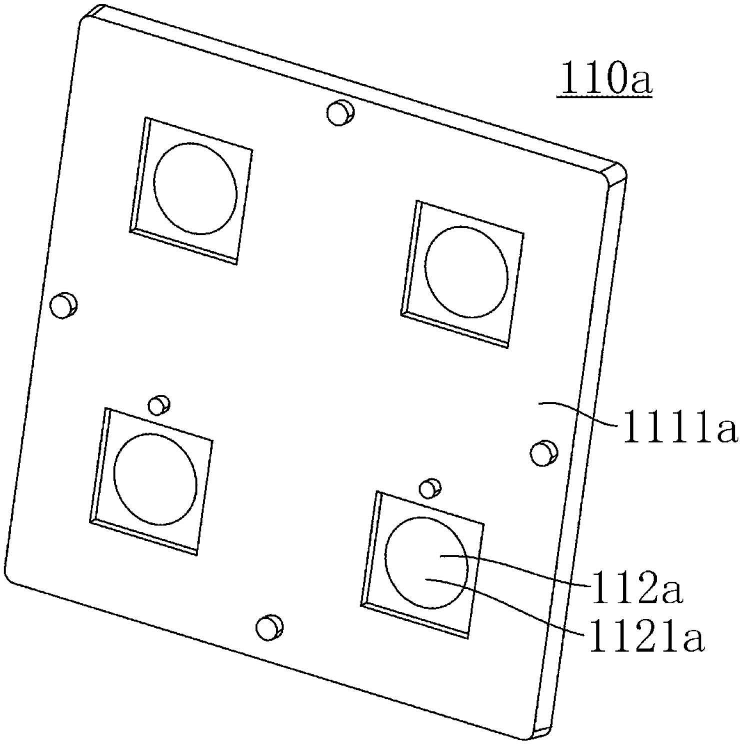
FIG. 12 is a schematic view of a transparent cover according to another embodiment provided by the present disclosure.
Figure 13:
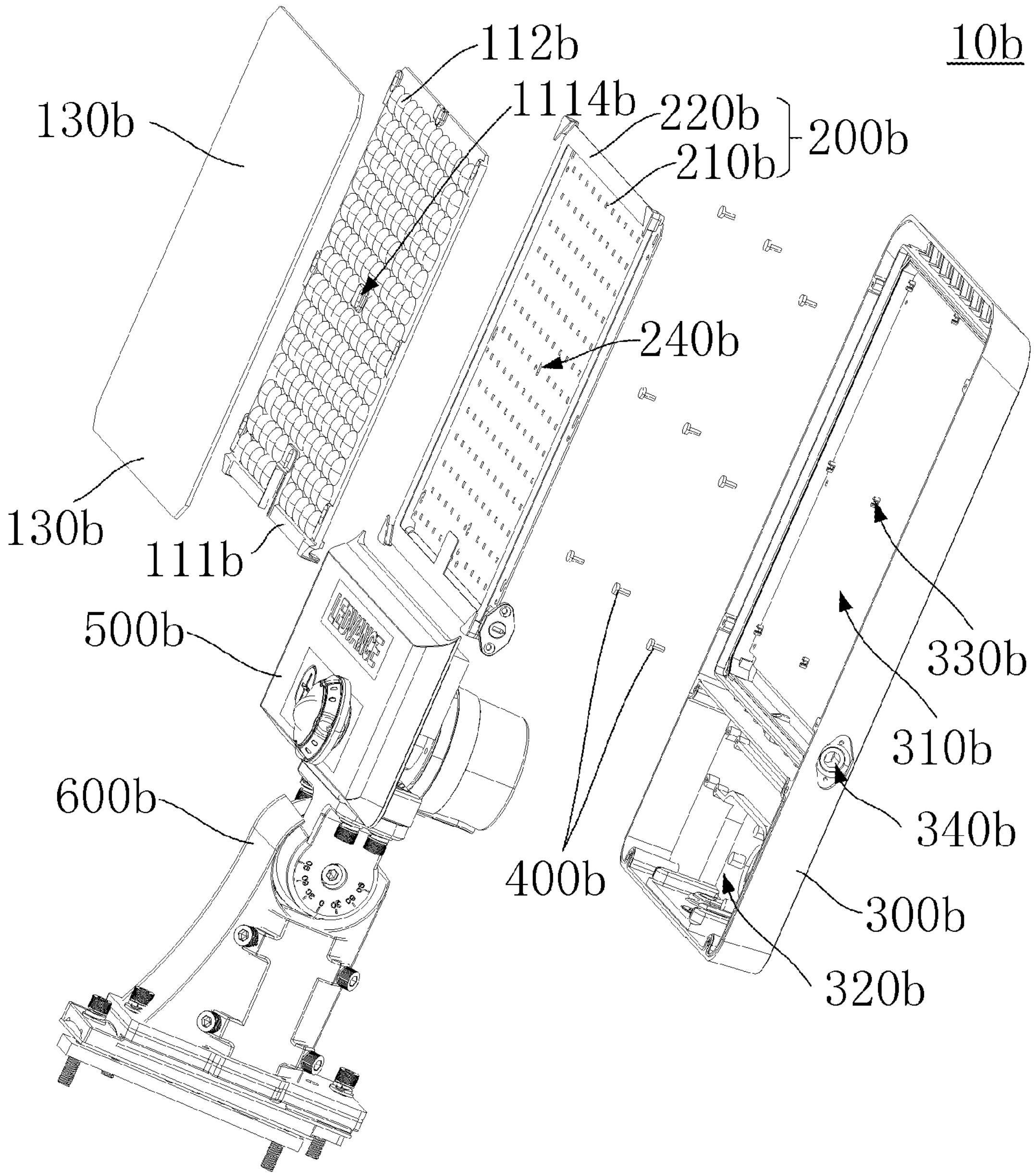
FIG. 13 is an exploded, schematic view of a luminous device according to another embodiment provided by the present disclosure.
Figure 14:
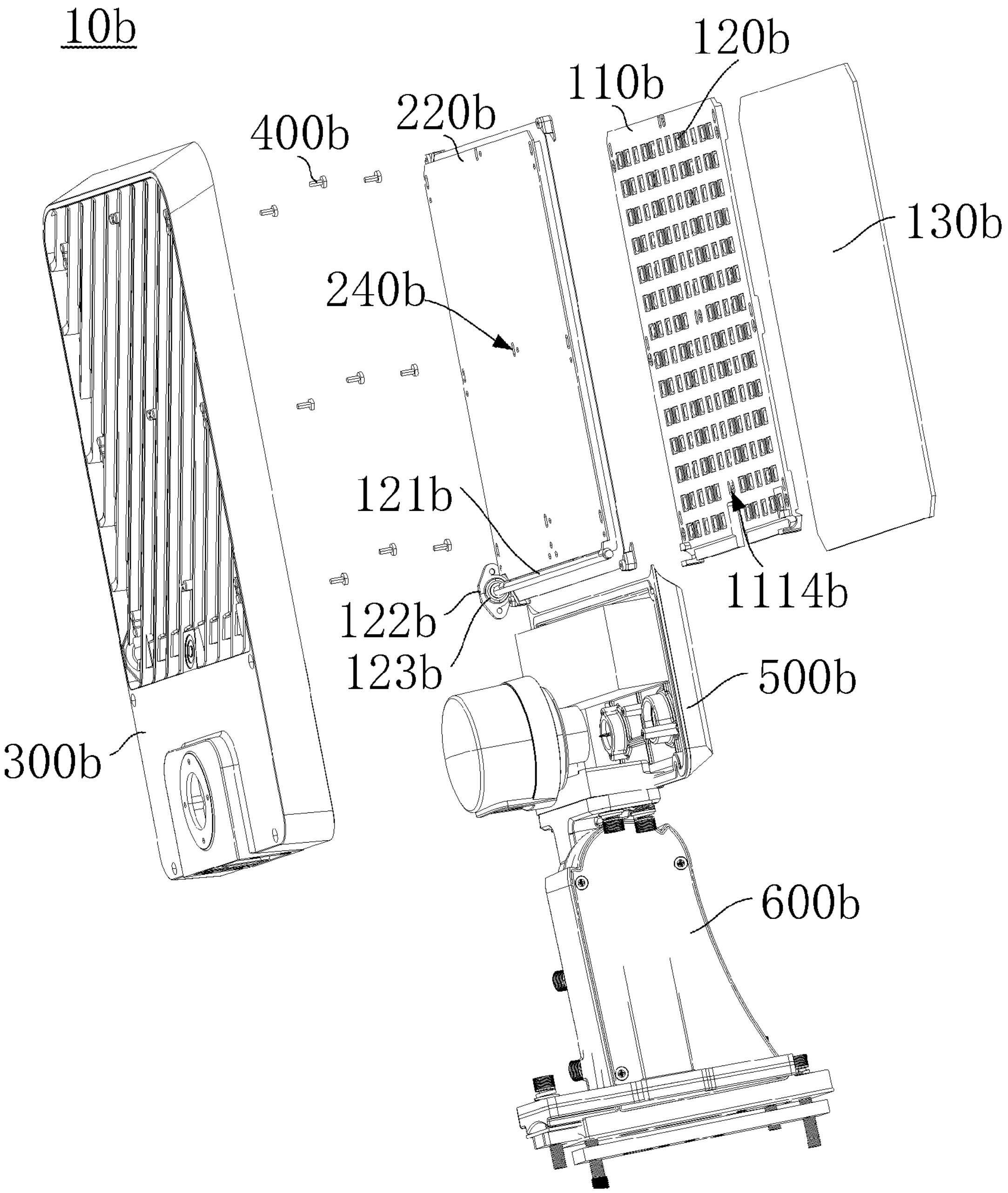
FIG. 14 is an exploded, schematic view of a luminous device according to another embodiment provided by the present disclosure.
Figure 15:
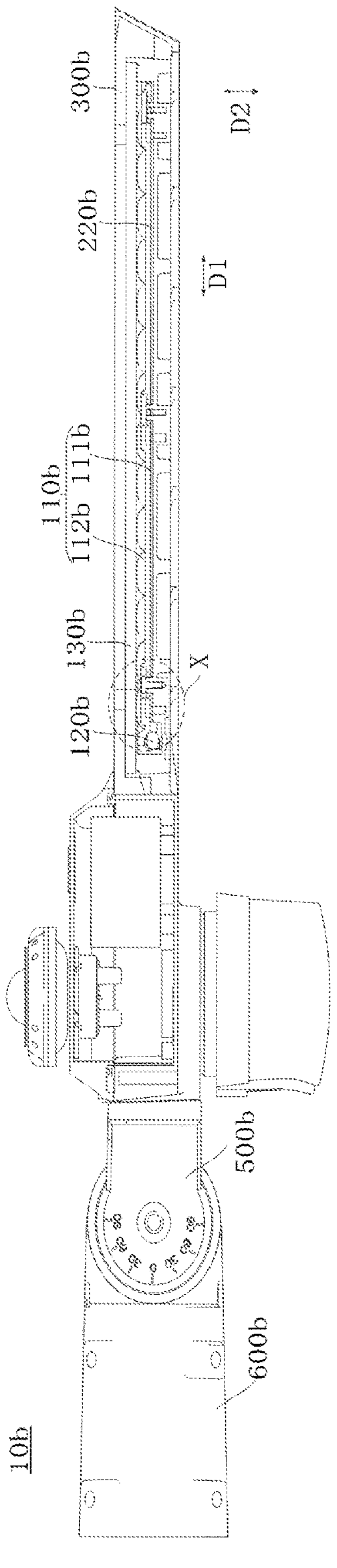
FIG. 15 is a cross-sectional view of the luminous device of FIG. 13.
Figure 16:
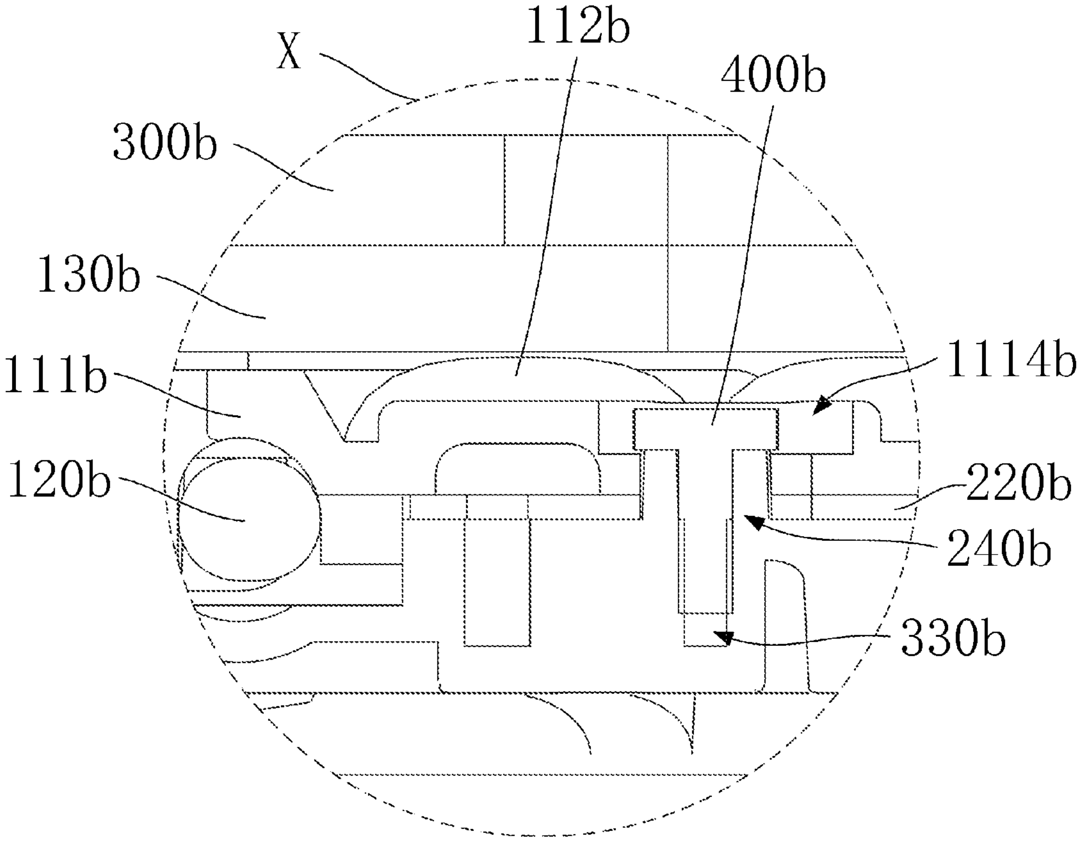
FIG. 16 is an enlarged view of a circle X of FIG. 15.

Referring to FIG. 12 when the driving member 120 is in a second state, the distance between the driving shaft 122 and the first moving plate 114 is roughly equal to the distance between the driving shaft 122 and the second moving plate 115. The side of the eccentric wheel 123 away from the axis of the driving shaft 122 is away from or near the extending portion 222. A portion of the second moving plate 115 moves from an edge of the extending portion 222 towards a direction away from the extending portion 222, so that a distance L1 is formed between the side of the second moving plate 115 away from the first moving plate 114 and the extending portion 222, wherein the distance L1 is greater than zero. The specific position of the light-emitting element 210 corresponds to a second position T2 of the light transparent portions 112.

Referring to FIG. 3, when the driving member 120 is in a third state, the distance between the driving shaft 122 and the first moving plate 114 is smaller than the distance between the driving shaft 122 and the second moving plate 115. For example, the side of the eccentric wheel 123 away from the axis of the driving shaft 122 is in contact with the second moving plate 115. The side of the eccentric wheel 123 near the axis of the driving shaft 122 is in contact with the first moving plate 114, or the driving shaft 122 is directly in contact with the first moving plate 114. The portion of the second moving plate 115 moves from the end of the extending portion 222 towards the direction away from the extending portion 222, so that a distance L2 is formed between the side of the second moving plate 115 away from the first moving plate 114 and the extending portion 222, wherein the distance L2 is greater than the distance L1. The specific position of the light-emitting element 210 corresponds to a third position T3 of the light transparent portions 112.

Radians of the first position T1, the second position T2 and the third position T3 of the light transparent portions 112 are different, so that the transmission path of light emitted by the plurality of light-emitting elements 210 passing through the plurality of light transparent portions 112 can be changed.

A thickness of each of the first position T1, the second position T2 and the third position T3 of the light transparent portions 112 is different, so that the transmission path of light emitted by the plurality of light-emitting elements 210 passing through the plurality of light transparent portions 112 can be changed.

The distance between the first position T1 of the light transparent portion 112 and the specific position of the light-emitting element 210 as shown in FIG. 1, the distance between the second position T2 of the light transparent portion 112 and the specific position of the light-emitting element 210 as shown in FIG. 2, and the distance between the third position T3 of the light transparent portion 112 and the specific position of the light-emitting element 210 as shown in FIG. 3, decrease sequentially, so as to change the transmission path that the light emitted by the plurality of light-emitting elements 210 passes through the plurality of light transparent portions 112.

It should be noted that the driving member 120 can also drive both the light transparent portion 112 and the body 111 to move along a direction opposite to the moving direction as shown in FIG. 1 to FIG. 3, which will not illustrate with examples herein.

The preset range can be referenced to the distances L1, L2, which will not illustrate with examples herein.

In other optical embodiments of the present disclosure, the body 111 and the plurality of light transparent portions 112 can move relative to each other, and the plurality of light transparent portions 112 can move along the preset path under preset conditions to change the transmission path that the light emitted by the plurality of light-emitting elements 210 passes through the plurality of light transparent portions 112, while the body 111 does not move, wherein the preset conditions and the preset path can be referenced to the above contents, which will not be repeated herein.

The transparent cover 110 further includes a plurality of supporting portions 113 arranged on the body 111. For example, the plurality of supporting portions 113 is spaced from the plurality of light transparent portions 112, and abuts against the loading member 220 to separate the first surface 1111 from the loading member 220, so that a certain gap is formed between the body 111 and the light-emitting member 200 to ensure gas flow therefrom, which is beneficial for heat dissipation of the loading member 220 and the light-emitting element 210, to improve heat dissipation efficiency of the luminous device 10.

The plurality of supporting portions 113 is integrated with the body 111. In other optical embodiments of the present disclosure, the plurality of supporting portions 113 is separated from the body 111, and installed on the first surface 1111.

The loading member 220 can include a plurality of strip grooves for receiving corresponding supporting portions 113 therein, for example, one supporting portion 113 is inserted into a corresponding strip groove of the loading member 220. The supporting portion 113 can move within the strip groove of the loading member 220 to adapt to the movement of the body 111 and the light transparent portion 112. At the same time, the strip groove of the loading member 220 can provide a support for the movement of the supporting portion 113 within a spatial range of the strip groove, which can limit the movement of the body 111 and the light transparent portion 112 to increase stability of the body 111 and the light transparent portion 112 in a certain extent.

In other optical embodiments of the present disclosure, the transparent cover 110 further includes a plurality of strip grooves arranged on the first surface 1111 of the body 111, and the loading member 220 includes a plurality of supporting portions. One of the plurality of supporting portions 113 of the loading member 220 can be placed in a corresponding strip groove of the transparent cover 110, for example, one of the plurality of supporting portions 113 of the loading member 220 can be inserted into a corresponding strip groove of the transparent cover 110. The supporting portion 113 of the loading member 220 can move within the strip groove of the transparent cover 110 to adapt to the movement of the body 111 and the light transparent portion 112. At the same time, the strip groove of the transparent cover 110 can provide a support for the supporting portion 113 of the loading member 220 to move within the spatial range of the strip groove of the transparent cover 110, which can limit the movement of the body 111 and the light transparent portion 112 to increase stability of the body 111 and the light transparent portion 112 in a certain extent.

During the movement of the plurality of light transparent portions 112, at least one part of the plurality of light transparent portions 112 remains above at least one part of the plurality of light-emitting elements 210, to ensure that the light emitted by the plurality of light-emitting elements 210 can be transmitted to the outside through the plurality of light transparent portions 112. For example, the body 111 includes a plurality of limiting grooves 1113 formed on the first surface 1111 and surrounding around the plurality of light transparent portions 112 one by one, and the plurality of limiting grooves 1113 can receive corresponding light-emitting elements 210 therein. During the movement of the transparent cover 110, a position of the limiting groove 1113 relative to the light-emitting element 210 can be changed, so that the light-emitting element 210 an be received inside the limiting groove 1113.

The limiting groove 1113 is connected with the recess 1123.

At least one of the plurality of limiting grooves 1113 is selected from one of a circular groove, a rectangular groove and an elliptical groove.

The transparent cover 110 further includes a direction sign 117 arranged on the second surface 1112 and configured to indicate a direction that the transparent cover 110 moves.

Referring to FIG. 12, the present disclosure also provides a transparent cover 110*a*, which differs from the above mentioned transparent cover 110 in that: the light incident surface 1121*a* of the light transparent portion 112*a* is a plane, and the light incident surface 1121*a* is roughly parallel to the first surface 1111*a*. Other settings of the transparent cover 110*a* can be referenced to the above mentioned transparent cover 110, which will not provide specific examples herein.

In other optical embodiments of the present disclosure, the light incident surface 1121*a* can be other shapes, such as trapezoidal surfaces, etc.

Referring to FIG. 13 to FIG. 16, differences between the luminous device 10*b* and the above mentioned luminous device 10 at least include: the luminous device 10*b* includes a transparent cover 110*b*, a light-emitting member 200*b*, a driving member 120*b* and a housing 300*b*. The housing 300*b* includes a first receiving groove 310*b* and a second receiving groove 320*b*, wherein the first receiving groove 310*b* is configured to receive the light-emitting member 200*b*, the transparent cover 110*b*, and at least a portion of the driving member 120*b* therein.

The differences between the luminous device 10*b* and the above mentioned luminous device 10 at least include: the luminous device 10*b* further includes a control member 500*b* and a supporting member 600*b*; the supporting member 600*b* installed in a preset position of the luminous device 10*b* to support the luminous device 10*b*. The control member 500*b* and the supporting member 600*b* are rotatably connected to each other. The control member 500*b* is at least partially installed in the second receiving groove 320*b*, and connected to the housing 300*b*, so that both the control member 500*b* and the housing 300*b* can rotate relative to the supporting member 600*b*, so as to adjust an angle that the housing 300*b* is relative to the supporting member 600*b*.

The control member 500*b* can include power supply components such as batteries. An exemplary control member 500*b* can include control components such as control switches.

The transparent cover 110*b* include a body 111*b* and a plurality of light transparent portions 112*b* arranged on the body 111*b* that can be referenced to the above mentioned transparent portions 112, which will not be repeated here. A difference between the transparent cover 110*b* and the above mentioned transparent cover 110*b* is that: the transparent cover 110*b* includes a plurality of first moving holes 1114*b* passing through the body 111*b* at least along a thickness direction D2 of the luminous device 10*b*.

The light-emitting member 200*b* can include a loading member 220*b* and a plurality of light-emitting elements 210*b*, the plurality of light-emitting elements 210*b* can be referenced to the above mentioned light-emitting elements 210, which will not be repeated herein. A difference between the light-emitting element 210*b* and the above mentioned light-emitting element 210 is that: the light-emitting element 210*b* includes a plurality of second moving holes 240*b* passing through the loading member 220*b* at least along the thickness direction D2 of the luminous device 10*b*.

The light-emitting element 210*b* and the transparent cover 110*b* can move relative to each other, such as moving relative to each other along a length direction D1 of the luminous device 10*b*, to change the transmission path that the light emitted by the plurality of light-emitting elements 210*b* passes through the plurality of light transparent portions 112*b*. For example, the luminous device 10*b* also includes a driving member 120*b* that can be connected to at least one of the light-emitting element 210*b* and the transparent cover 110*b* to drive the light-emitting element 210*b* and the transparent cover 110*b* to move relative to each other along the length direction D1 of the luminous device 10*b*. For example, the driving member 120*b* includes a driving rod 121*b*, a limiting member 122*b* and a sealing element 123*b*. The housing 300*b* includes a shaft hole 340*b* so that the driving rod 121*b* can pass through the shaft hole 340*b* to connect to the transparent cover 110*b* and/or the light-emitting member 200*b*. The sealing element 123*b* is sleeved on the driving rod 121*b*, and fixed to the housing 300*b* by the limiting member 122*b*, so as to seal a gap between the driving rod 121*b* and the housing 300*b*, which can play a waterproof role to a certain extent. The limiting member 122*b* can be installed on the housing 300*b* by screws.

The driving rod 121*b* can be manually controlled or controlled by a driving motor, which is not limited here.

The driving member 120*b* is connected to the transparent cover 110*b* to drive the transparent cover 110*b* to move relative to the light-emitting member 200*b* along the length direction D1 of the luminous device 10*b*. For example, the driving member 120*b* is connected to the light-emitting member 200*b* to drive the light-emitting member 200*b* to move relative to the transparent cover 110*b* along the length direction D1 of the luminous device 10*b*. For example, the driving member 120*b* is connected to both the light-emitting member 200*b* and the transparent cover 110*b* to drive both the light-emitting member 200*b* and the transparent cover 110*b* to move, so that both the light-emitting member 200*b* and the transparent cover 110*b* move relative to each other along the length direction D1 of the luminous device 10*b*.

The light-emitting member 200*b* and the transparent cover 110*b* can also move relative to each other along other directions, such as moving along a width direction of the luminous device 10*b*, wherein the width direction of the luminous device 10*b* is perpendicular to the length direction D1 and the thickness direction D2 of the luminous device 10*b*.

The housing 300*b* further includes a plurality of fixing holes 330*b* arranged on a bottom wall of the first receiving groove 310*b*, the plurality of fixing holes 330*b* connected to the first receiving groove 310*b*.

The differences between the luminous device 10*b* and the above mentioned luminous device 10 at least include: the luminous device 10*b* further includes a plurality of limiting rods 400*b*, such as screws. Any one of the plurality of limiting rods 400*b* can sequentially pass through the first moving hole 1114*b*, the second moving hole 240*b* and the fixing hole 330*b*, to connect to the housing 300*b*. For example, a size of at least one of the first moving hole 1114*b* and the second moving hole 240*b* is larger than that of the limiting rod 400*b*, so that both the light-emitting member 200*b* and the transparent cover 110*b* can move relative to each other. The limiting rod 400*b* is provided to limit the movement of the light-emitting member 200*b* and the transparent cover 110*b* along the thickness direction D2 of the luminous device 10*b*.

The difference between the luminous device 10*b* and the above mentioned luminous device 10 at least includes: the luminous device 10*b* further includes a protective cover 130*b* with a transparent structure thereof the proactive cover 130*b* arranged above the transparent cover 110*b* to provide the transparent cover 110*b* from being damaged.

The above provides a detailed description to the transparent cover, the cover assembly and the luminous device of the present disclosure. Specific examples are applied in the specification to explain principles and implementations of the present disclosure. The explanations of the above embodiments are only to help understand the subject matter of the present disclosure. Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one or ordinary skilled in the related art without departing from the spirit of the present disclosure shall fall within the protection scope of the present disclosure.

What is claimed is:

1. A transparent cover arranged above a plurality of light-emitting elements, the transparent cover comprising:

a body;

a plurality of light transparent portions arranged on the body at intervals;

the plurality of light transparent portions arranged above the plurality of light-emitting elements, wherein light emitted by the plurality of light-emitting elements can be transmitted to outside through the plurality of light transparent portions; and wherein the body and the plurality of light transparent portions can move along a preset path under preset conditions to change a transmission path that the light emitted by the plurality of light-emitting elements passes through the plurality of light transparent portions; and wherein when the transparent cover moves to a first state, a specific position of each of the plurality of the light-emitting elements corresponds to a first position of each of the plurality of light transparent portions; and wherein when the transparent cover moves to a second state, the specific position of each of the plurality of the light-emitting elements corresponds to a second position of each of the plurality of light transparent portions; and wherein when the transparent cover moves to a third state, the specific position of each of the plurality of the light-emitting elements corresponds to a third position of each of the plurality of light transparent portions; and wherein radians of the first position, the second position and the third position of the light transparent portions are different, and a thickness of each of the first position, the second position and the third position of the light transparent portions is different; and wherein a distance between the first position of the light transparent portion and the specific position of the light-emitting element, a distance between the second position of the light transparent portion and the specific position of the light-emitting element, and a distance between the third position of the light transparent portion and the specific position of the light-emitting element, decrease sequentially, so as to change the transmission path that the light emitted by the plurality of light-emitting elements passes through the plurality of light transparent portions.

2. The transparent cover as claimed in claim 1, wherein the plurality of light transparent portions can move to change a thickness that the light emitted by the plurality of light-emitting elements passes through the plurality of light transparent portions; or the plurality of light transparent portions can move to change radians that the light emitted by the plurality of light-emitting elements passes through the plurality of light transparent portions; or the plurality of light transparent portions can move to change distances between the plurality of light-emitting elements and the plurality of light transparent portions.

3. The transparent cover as claimed in claim 1, wherein the body comprises a first surface and a second surface opposite to the first surface;

each of the plurality of light transparent portions comprising a light incident surface and a light-emitting surface opposite to the light incident surface, the light incident surface and the first surface formed on the same surface of the transparent cover, and the light-emitting surface and the second surface formed on the other same surface of the transparent cover; and a part of any one of the plurality of light transparent portions protruding out of the second surface.

4. The transparent cover as claimed in claim 3, wherein an edge of light-emitting surface is connected to the second surface, and the light-emitting surface is a cambered surface, especially a circular cambered surface.

5. The transparent cover as claimed in claim 3, wherein the light incident surface is non-protruded out of the first surface.

6. The transparent cover as claimed in claim 5, wherein the light incident surface is a plane and is approximately parallel to the first surface.

7. The transparent cover as claimed in claim 5, wherein the light incident surface is concave to the first surface so that a recess is formed on any one of the plurality of light transparent portions.

8. The transparent cover as claimed in claim 6, wherein the light incident surface is a cambered surface, especially a circular cambered surface.

9. The transparent cover as claimed in claim 1, wherein during moving the plurality of light transparent portions, at least one part of the plurality of light transparent portions remains above at least one part of the plurality of light-emitting elements.

10. The transparent cover as claimed in claim 9, wherein the body comprises a first surface and a second surface opposite to the first surface;

each of the plurality of light transparent portions comprising a light incident surface and a light-emitting surface opposite to the light incident surface, the light incident surface and the first surface formed on the same surface of the transparent cover, and the light-emitting surface and the second surface formed on the other same surface of the transparent cover; and wherein the body comprises a plurality of limiting grooves formed on the first surface, each of the plurality of limiting grooves arranged around a corresponding transparent portion, and each of the plurality of light-emitting elements received in a corresponding limiting groove.

11. The transparent cover as claimed in claim 10, wherein at least one of the plurality of limiting grooves is selected from one of a circular groove, a rectangular groove and an elliptical groove.

12. The transparent cover as claimed in claim 1, wherein the body comprises a first surface and a second surface opposite to the first surface;

each of the plurality of light transparent portions comprising a light incident surface and a light-emitting surface opposite to the light incident surface, the light incident surface and the first surface formed on the same surface of the transparent cover, and the light-emitting surface and the second surface formed on the other same surface of the transparent cover; and wherein the transparent cover further comprises a plurality of supporting portions arranged on the first surface, and the plurality of supporting portions spaced from the plurality of light transparent portions.

13. The transparent cover as claimed in claim 12, wherein all the body, the plurality of light transparent portions and the plurality of supporting portions are integrated together.

14. The transparent cover as claimed in claim 1, wherein the plurality of light transparent portions is arranged on the body in a matrix mode.

15. A cover assembly comprising:

a transparent cover arranged above a plurality of light-emitting elements, the transparent cover comprising:

a body;

a plurality of light transparent portions arranged on the body at intervals;

the plurality of light transparent portions arranged above the plurality of light-emitting elements, wherein light emitted by the plurality of light-emitting elements can be transmitted to outside through the plurality of light transparent portions; and wherein the body and the plurality of light transparent portions can move along a preset path under preset conditions to change a transmission path that the light emitted by the plurality of light-emitting elements passes through the plurality of light transparent portions; and a driving member configured to drive the transparent cover to move along the preset path; and wherein the driving member comprises a drive, a driving shaft and an eccentric wheel, the drive connected to the driving shaft and the driving shaft connected to the eccentric wheel; and wherein the drive is capable of driving the driving shaft to rotate, so that the driving shaft is capable of driving the eccentric wheel to rotate and the eccentric wheel is capable of driving the transparent cover to move; and wherein the cover assembly further comprises a first moving plate and a second moving plate, both the first moving plate and the second moving plate arranged on the body; the first moving plate and the second moving plate spaced from each other to form an active space therebetween, the eccentric wheel received in the active space and driving the first moving plate and/or the second moving plate within the active space to further drive the transparent cover to move.

16. The transparent cover as claimed in claim 15, wherein when the driving member is in a first state, a distance between the driving shaft and the first moving plate is greater than a distance between the driving shaft and the second moving plate, wherein a side of the eccentric wheel away from the axis of the driving shaft is in contact with the first moving plate, a side of the eccentric wheel near the axis of the driving shaft is in contact with the second moving plate or the driving shaft is directly in contact with the second moving plate, and the second moving plate is completely installed within the receiving room, one of the plurality of light-emitting elements arranged below one of the plurality of light transparent portions, and a specific position of the light-emitting element corresponding to a first position of the light transparent portion; and wherein when the driving member is in a second state, the specific position of the light-emitting element corresponds to a second position of the light transparent portion; and wherein when the driving member is in a third state, the distance between the driving shaft and the first moving plate is smaller than the distance between the driving shaft and the second moving plate, a side of the eccentric wheel away from the axis of the driving shaft is in contact with the second moving plate 115, a side of the eccentric wheel near the axis of the driving shaft is in contact with the first moving plate, or the driving shaft is directly in contact with the first moving plate, a specific position of the light-emitting element corresponding to a third position of the light transparent portion.

17. The transparent cover as claimed in claim 16, wherein radians of the first position, the second position and the third position of the light transparent portion are different, so that the transmission path of light emitted by the plurality of light-emitting elements passing through the plurality of light transparent portions can be changed.

18. The transparent cover as claimed in claim 16, wherein a thickness of each of the first position, the second position and the third position of the light transparent portion is different, so that the transmission path of light emitted by the plurality of light-emitting elements passing through the plurality of light transparent portions can be changed.

19. The transparent cover as claimed in claim 16, wherein a distance between the first position of the light transparent portion and the specific position of the light-emitting element, a distance between the second position of the light transparent portion and the specific position of the light-emitting element, and a distance between the third position of the light transparent portion and the specific position of the light-emitting element, decrease sequentially, so as to change the transmission path that the light emitted by the plurality of light-emitting elements passes through the plurality of light transparent portions.

20. A luminous device comprising:

a transparent cover arranged above a plurality of light-emitting elements, the transparent cover comprising:

a body;

a plurality of light transparent portions arranged on the body at intervals;

the plurality of light transparent portions arranged above the plurality of light-emitting elements, wherein light emitted by the plurality of light-emitting elements can be transmitted to outside through the plurality of light transparent portions; and wherein the body and the plurality of light transparent portions can move along a preset path under preset conditions to change a transmission path that the light emitted by the plurality of light-emitting elements passes through the plurality of light transparent portions;

a light-emitting member comprising a loading member and a plurality of light-emitting elements arranged on the loading member and arranged below the plurality of light transparent portions; and a driving member configured to drive the transparent cover to move along the preset path; and wherein the driving member comprises a drive, a driving shaft and an eccentric wheel, the drive connected to the driving shaft and the driving shaft connected to the eccentric wheel; and wherein the drive is capable of driving the driving shaft to rotate, so that the driving shaft is capable of driving the eccentric wheel to rotate and the eccentric wheel is capable of driving the transparent cover to move; and wherein the cover assembly further comprises a first moving plate and a second moving plate, both the first moving plate and the second moving plate arranged on the body; the first moving plate and the second moving plate spaced from each other to form an active space therebetween, the eccentric wheel received in the active space and driving the first moving plate and/or the second moving plate within the active space to further drive the transparent cover to move.

21. A luminous device comprising:

a transparent cover comprising a body and a plurality of light transparent portions arranged on the body;

a light-emitting member comprising a loading member and a plurality of light-emitting elements arranged on the loading member and arranged below the plurality of light transparent portions, wherein light emitted by the plurality of light-emitting elements can be transmitted to outside through the plurality of light transparent portions; and wherein the light-emitting member and the transparent cover can move relative to each other to change a transmission path that the light emitted by the plurality of light-emitting elements passes through the plurality of light transparent portions; and wherein the luminous device further comprises a driving member connected to at least one of the transparent cover and the light-emitting member to drive the light-emitting member and the transparent cover to move to relative to each other; and wherein the luminous device further comprises a housing and a plurality of limiting rods, all the transparent cover, the light-emitting member and the driving member installed on the housing, and the housing comprising a plurality of fixing holes;

the transparent cover comprising a plurality of second moving holes at least passing through the loading member along the thickness direction of the luminous device; and wherein the plurality of limiting rods can sequentially and correspondingly pass through the plurality of first moving holes, the plurality of second moving holes and the plurality of fixing holes, to connect to the housing so that the light-emitting member and the transparent cover can move in a length direction and/or a width direction of the luminous device, and limit the light-emitting member and the transparent cover to move in the thickness direction of the luminous device.

22. The luminous device as claimed in claim 21, wherein the luminous device further comprises a protective cover with a transparent structure thereof, the protective cover arranged above the transparent cover to provide the transparent cover from being damaged.

23. The luminous device as claimed in claim 21, wherein the driving member comprises a driving rod, a limiting member and a sealing element, and the housing comprises a shaft hole so that the driving rod can pass through the shaft hole to connect to the transparent cover and/or the light-emitting member, the sealing element sleeved on the driving rod, and fixed to the housing by the limiting member, so as to seal a gap between the driving rod and the housing.

* * * * *